United States

Scholten 4,050,775

Sept. 27, 1977

[54] CATOPTRIC LENS ARRANGEMENT

[75] Inventor: James R. Scholten, Wayland, Mass.

[73] Assignee: The United States of America as represented by the Secretary of the Navy, Washington, D.C.

[21] Appl. No.: 708,668

[22] Filed: July 26, 1976

[51] Int. Cl.$^2$ .................. G02B 17/06; G02B 5/10
[52] U.S. Cl. ................... 350/200; 350/294; 350/299
[58] Field of Search .......... 350/199, 200, 293, 294, 350/299; 240/41.3, 41.38 A, 93

[56] References Cited

U.S. PATENT DOCUMENTS 3,796,886   3/1974   Freeman ................ 240/41.3 X

Primary Examiner—Paul A. Sacher

Attorney, Agent, or Firm—R. S. Sciascia; L. I. Shrago; C. E. Vautrain, Jr.

[57] ABSTRACT

A family of catoptric lens arrangements is provided for focusing a maximum amount of light from an omnidirectional source into a parallel or conical beam. A rear spherical-curvature reflector is inserted into a conventional forward spherical plus rear parabolic reflector arrangement, with its center of curvature and the light source both at the focal point of the parabolic reflector. In addition, a forward collimating lens is substituted for the central portion of the forward reflector. The theoretical 100% efficiency achieved by this arrangement is independent of the diameters of the forward and rear reflectors provided, of course, that the positions and curvatures are suitably compensated.

10 Claims, 5 Drawing Figures

CATOPTRIC LENS ARRANGEMENT

The present invention concerns catoptric lenses and, more particularly, arrangements of this nature which focus a maximum amount of light from an omnidirectional source into parallel or conical beams.

Catoptric lens arrangements have been used in the art to generate substantially parallel beams of wave energy, in a variety of manners dictated by the limits imposed by the particular system in which the arrangements are deployed. A perfectly parallel beam is in practice impossible to generate, since to do so would require a true point source of light and, ultimately, an optical system of infinite aperture. Common collimator arrangements are the small parabola, the large parabola, and a small parabola with a hemispheric reflector. These prior arrangements have deficiencies, chiefly poor luminous efficiency with typical values being 50% for the small parabola, 70% for the large parabola, and 60% to 80% for the small parabola with hemispheric reflector. A further deficiency is that the size of the light source within these arrangements is limited, in the first two instances to the focal length of the parabola, and in the third instance to about half such focal length depending upon the radius of the hemispheric reflector. Also, the lack of much possibility for fine tuning of these arrangements is a weakness in that with the small or large parabola only the source position can be adjusted while with the small parabola with hemispheric reflector the hemisphere also can be moved. In sum, these prior catoptric lens arrangements have a low light capturing efficiency, are unable to accommodate light sources which are physically large compared to the focal length, and are difficult to "fine tune". The present invention overcomes these deficiencies, achieving a theoretical 100% illuminous efficiency from an only slightly more complicated arrangement. It includes substantial possibilities for fine tuning, and for accommodating larger light sources.

Accordingly, it is an object of the present invention to provide a simple method and means for focusing a maximum amount of light from an omnidirectional, and possibly large, source into parallel or conical beams.

Another object of this invention is to provide catoptric lens arrangements which are adapted for fine tuning by independent adjustment of more than one component thereof.

Other objects, advantages and novel features of the invention will become apparent from the following detailed description thereof when considered in conjunction with the accompanying drawings in which like numerals represent like parts throughout and wherein.

The present invention, in general, is a novel design for catoptric lens arrangements which incorporates the additional optical components of a forward collimating lens and a rear hemispherical reflector. These components operate to capture the light that leaves the source in directions close to the axis of the collimator. They overcome a major deficiency of previous designs, namely, allowing a large fraction of the light to uselessly escape from the optics.

Figure 1:
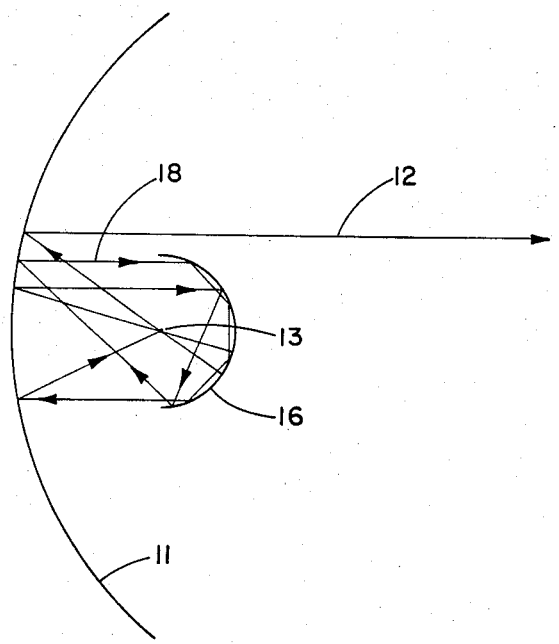
FIG. 1 is a schematic diagram of a conventional catoptric lens comprising a small parabola and a hemispheric reflector.

Referring in detail to the drawings, FIG. 1 illustrates a conventional small parabola catoptric lens arrangement in which a parabolic surface 11 reflects a collimated beam of light indicated at 12 from an omnidirectional light source 13. Light source 13 is positioned at the focal point of surface 11 and also at the center of curvature of a hemispherical reflector 16. This hemisphere serves to direct otherwise non-collimated light back through the source region, to be "collimated" by the rear parabolic reflector. This system, obviously, is only 60% to 80% efficient, since many light rays from source 13 do not properly escape the reflectors; an example is ray 18, which is re-reflected destructively within the two reflecting surfaces.

Figure 2:
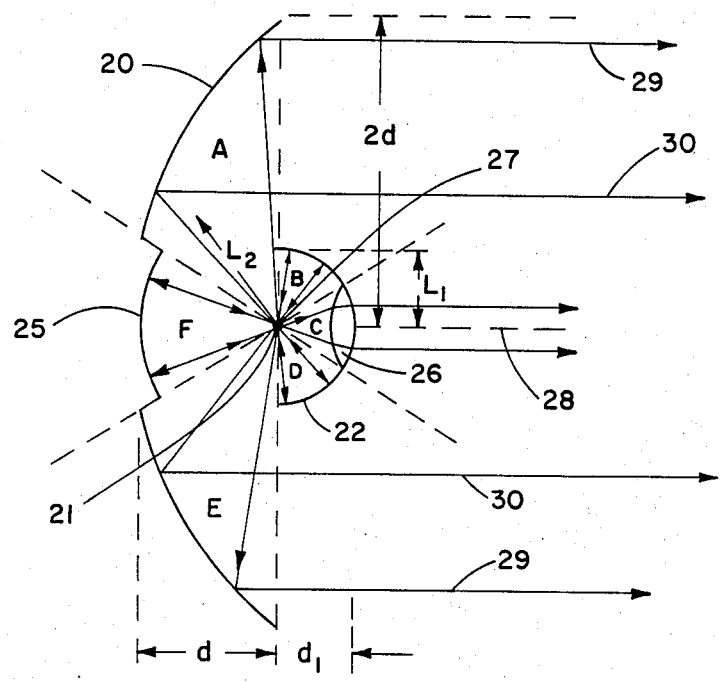
FIG. 2 is a schematic diagram of one embodiment of the invention which features spherical reflectors of differing curvature.

FIG. 2 is a schematic illustration of one embodiment of the present invention in which a parabolic surface 20 having a focal point 21 is combined with a hemispherical reflector 22 having focal point 21 as its center and a second spherical surface 25, which has a chord sufficient to produce a shadow on the parabola of the same diameter as reflector 22. This arrangement assures that the forward reflector does not block any of the output rays from the rear parabola. A circular collimating lens 26 is inserted in, i.e., replaces, a portion of reflector 22 so that any line from the boundary of lens 26 through the source of light 27, which is positioned at focal point 21, will intercept the boundary of rear spherical deflector 25. In order that this condition be satisfied, the lens semiaperture or physical radius in this case must be $L_1^2/d$. This assures that any forward light ray from the source which does not pass directly through lens 26 will be reflected by reflector 22 back through focal point 21 to parabolic surface 20 from where it will be reflected parallel to axis 28. In this embodiment, radii $L_1$ and $L_2$ are potentially variable, $L_1$ being the radius of curvature of hemispherical reflector 22 and $L_2$ being that of external reflector 25.

For convenience of description, the light emanating from source 27 in FIG. 2 is divided into six sectors A, B, C, D, E, and F. It may be seen that light emitted to sectors A and E is singly reflected by parabolic surface 20 as indicated by rays 29. Light emitted to sectors B and D is reflected back through source 27 to parabolic surface 20 as indicated by rays 30. Light emitted to sector C is refracted and transmitted by lens 26, while light emitted to sector F is reflected back through the source via reflector 25 to lens 26. The angular size of sectors C and F varies with the ratio of $L_1$ to the focal length $d$ of surface 20. Although $L_1$ and $L_2$ are variable, the ratio of $L_1/d$ should be less than approximately 1 so as to not make construction of the lens difficult or impossible. The focal length of lens 26, $d_1$, is also variable; however, in the case of real, i.e. non-point, sources, rays or beams from reflector 20 and lens 26 will have equal divergence when $d_1 = d$.

Figure 3:
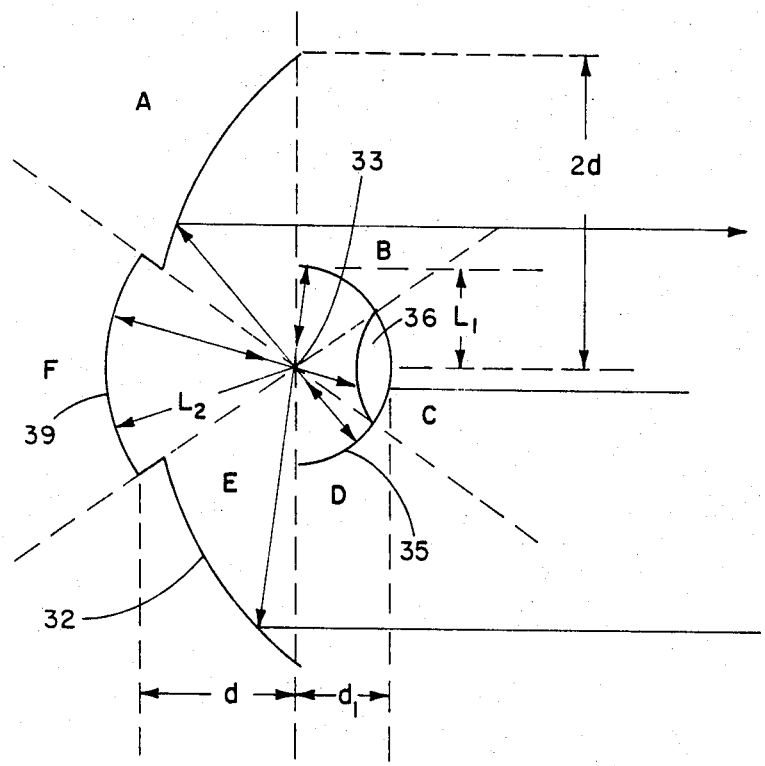
FIG. 3 is a schematic diagram of an alternate embodiment of the invention wherein one reflector is displaced from its position in the embodiment of FIG. 2.

In FIG. 3, a parabolic surface 32 having a focal point 33 is associated with a hemispherical reflector 35 having as its center focal point 33, a collimated lens 36, and an external spherical reflecting surface 39. This is the same arrangement as FIG. 2, except that $L_2$ is increased to be greater than $d$. The construction shown in FIG. 3 is suitable in instances where it may be difficult to construct a physical embodiment having the rear spherical reflector positioned within the parabola.

Figure 4:
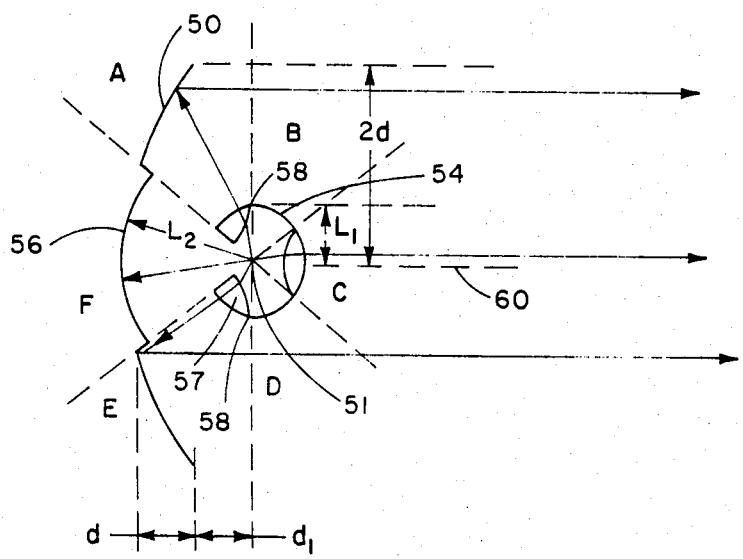
FIG. 4 is a schematic diagram of an alternate form of the embodiment of FIG. 2 which includes an annular lens associated with one of the hemispheric reflectors.

FIG. 4 illustrates a more complex embodiment, which serves to further reduce the size of the overall lens arrangement. In this case, an abbreviated parabolic surface 50 is made possible by the inclusion of an annular lens 57 whose apex periphery indicated at 58 coincides with the adjacent periphery of forward hemispheric reflector 54. Annular lens 57 refracts beams or rays in sectors A and E toward the optical axis of the system indicated at 60, thus allowing the shortening of parabolic surface 50.

Figure 5:
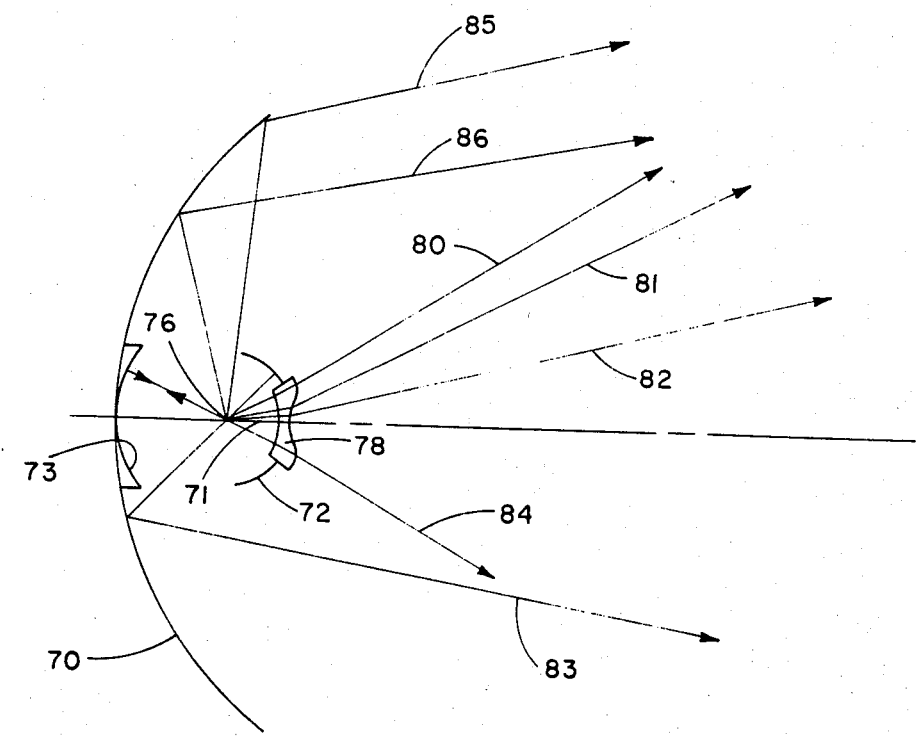
FIG. 5 is a schematic diagram showing how the system may be modified to produce a special-purpose conical beam shape.

As mentioned above, the present invention easily permits adjustment of the beam shape and intensity distribution as needed for any special purpose. FIG. 5 shows an example of how the beam pattern may be tailored to provide conically divergent rays. A parabolic reflector 70 having a focal point 71 is associated with a pair of opposed hemispherical reflectors 72 and 73 having their center at a point 76 which is inside the focal point of parabola 70 so as to produce a conical beam with extra light at its edge. An annular lens 78 of the general shape shown is positioned within reflector 72 so as to refract light rays from a source also positioned at point 76 at selected divergent angles as indicated by rays 80, 81 and 82. As in previous arrangements, rays which intercept reflector 72 are reflected to reflector 73 and re-reflected at a divergent angle as indicated at 83. Rays which intercept reflector 73 directly are reflected and refracted through lens 78 as indicated at 84, while rays which directly intercept parabola 70 also diverge as indicated at 85 and 86 depending upon the position of the light source along the system axis. The arrangement in FIG. 5 may be useful for wide angle illumination in fog or seawater where the edges of a beam suffer greater attenuation by the medium in the beam center. That is, the position of parabola 70 and the shape of lens 78 may be selected within wide ranges so as to better distribute light in areas where beam paths cross. This distribution occurs away from the central axis of the system and, therefore, avoids the attenuation of the edges of a concentrated collimated beam.

The present invention provides a novel catoptric lens arrangement which permits a maximum amount of light from an omnidirectional source to be focused into a parallel or conical beam. The lens arrangements combine forward and rear spherical reflectors, a forward collimating lens, and a rear parabolic reflector to provide substantially higher light capturing efficiency than is possible with prior catoptric lens arrangements. Moreover, the invention enables this to be achieved with components of smaller physical size than prior arrangements. This is possible because the invention is able to accommodate light sources which are in diameter as large as the focal length of the parabolic reflector, i.e. one-fourth of the overall diameter of the system. Another important advantage is that there are multiple provisions for adjustment or tuning of the beam pattern. These adjustments may be made by changing the shape and/or location of each component. The theoretical 100% luminous efficiency of the various embodiments, resulting from capture of the entire 12 pi steradians of solid angle of source emission, is independent of geometric parameters $L_1/d$ or $L_2/d$. The overall physical size of any embodiment may be reduced appreciably by adding an annular lens such as lens 57 in FIG. 4.

The present invention may be used in any application where a parallel or conical beam of light is required. Some applications are in underwater illumination for divers, submarines, towed photographic sleds, etc. The invention is also applicable in searchlight technology, for automobile headlights, for lighthouses, and for photographic strobes or floodlights, among other potential uses.

What is claimed is:

1. A catoptric lens system for focusing a maximum amount of light from an omnidirectional source into a parallel beam comprising:
   a set of spherical reflectors disposed symmetrically in opposed reflective relationship along a common system axis, said surfaces having a common center and unequal radii;
   a parabolic reflector symmetrically disposed in said system with said center as its focal point and having its reflective surface replaced in part by said spherical reflector having the greatest radius,
      said spherical reflector having the lesser radius hemispherical in extent,
      a collimating lens symmetrically disposed in said spherical reflector of lesser radius replacing in part its reflective surface; and
   a substantially point source of light positioned at said center,
      whereby all light from said source is collimated and emanates from said system either directly through said lens, by reflection and re-reflection from said spherical and parabolic reflectors, or directly from said parabolic reflector.

2. The system of claim 1 and further including an annular lens positioned coextensive with the circumference of said hemispherical reflector for refracting light away from said hemispherical reflector so as to reduce the required reflective surface of said parabolic reflector.

3. The system of claim 1 wherein said spherical reflector of greater radius is positioned intermediate said parabolic reflector and said center.

4. The system of claim 1 wherein said spherical reflector of greater radius is positioned remote from said parabolic reflector with respect to said center.

5. A catoptric lens system for focusing a maximum amount of light from an omnidirectional source into beams of selective light ray alignment comprising:
   a set of spherical reflectors disposed symmetrically in opposed reflective relationship along a common axis,
      said reflectors having a common center and unequal radii;
   an omnidirectional source of light positioned at said center;
   a parabolic reflector symmetrically disposed in said system with its focal point along said axis intermediate said hemispherical reflectors and having its reflective surface replaced in part by a sector of said spherical reflector having the greatest radius,
      said spherical reflector having the lesser radius hemispherical in extent; and a lens symmetrically disposed in said spherical reflector of lesser radius replacing in part its reflective surface, said system producing a beam of desired ray distribution by refracting or reflecting out substantially all light rays radiating from said source.

6. The lens system of claim 5 wherein the ratio of the diameter of the spherical reflector of lesser radius to the greatest distance along said axis from said center to said parabolic reflector is less than substantially 1.

7. The lens system of claim 6 wherein beam shape and intensity distribution are adjustable by changing said lens and repositioning said light source and said hemispherical reflectors.

8. The lens system of claim 7 wherein said lens is an annular lens and diverts rays at selected angles from said axis, and the focal point of said parabolic reflector is intermediate said center and said lens so as to produce a conical beam with extra light at its edge.

9. The lens system of claim 7 wherein said lens is a collimating lens and said center is at the focal point of said parabolic reflector so as to produce a parallel beam.

10. The lens system of claim 9 wherein said lens is an annular lens positioned coextensive with the circumference of said hemispherical reflector and configured so as to refract light away from said hemispherical reflector to said parabolic reflector whereby the required reflective surface of said parabolic reflector is substantially reduced.

* * * * *